(12) United States Patent
Davies

(10) Patent No.: US 6,856,810 B2
(45) Date of Patent: Feb. 15, 2005

(54) RADIO SYSTEM AND STATIONS FOR, AND METHOD OF, MULTICAST COMMUNICATION

(75) Inventor: Robert J. Davies, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 510 days.

(21) Appl. No.: 09/847,216

(22) Filed: May 2, 2001

(65) Prior Publication Data
US 2001/0046875 A1 Nov. 29, 2001

(30) Foreign Application Priority Data
May 23, 2000 (GB) .............................................. 0012409

(51) Int. Cl.[7] .............................. H04B 7/00; H04Q 7/20
(52) U.S. Cl. ................... 455/507; 455/513; 340/825.25
(58) Field of Search ............................... 455/507, 517, 455/522, 512, 513, 41.2, 41.3; 375/358; 340/3.5, 3.52, 825.25; 709/208

(56) References Cited

U.S. PATENT DOCUMENTS

| | | | | |
|---|---|---|---|---|
| 5,517,507 A | * | 5/1996 | Needham et al. | 371/32 |
| 5,923,662 A | * | 7/1999 | Stiring et al. | 370/432 |
| 6,016,567 A | * | 1/2000 | Fujiwara | 714/246 |
| 6,275,500 B1 | * | 8/2001 | Callaway et al. | 370/449 |
| 6,452,480 B1 | * | 9/2002 | Siep et al. | 340/3.5 |
| 2002/0034959 A1 | * | 3/2002 | Jamieson et al. | 455/517 |
| 2003/0143953 A1 | * | 7/2003 | Schmands et al. | 455/41 |
| 2003/0186715 A1 | * | 10/2003 | McGowan | 455/509 |

FOREIGN PATENT DOCUMENTS

| | | |
|---|---|---|
| EP | 0836297 A1 | 8/1997 |
| GB | 2287383 A | 3/1994 |

* cited by examiner

Primary Examiner—Nick Corsaro
Assistant Examiner—Edan Orgad

(57) ABSTRACT

A multicast radio data communication system comprising a master (1) and a plurality of slave stations (2, 3, 4), and using a retransmission protocol. Data is transmitted by the master station and received by the slave stations. One slave station is designated the primary slave station, and all other slaves are designated secondary slave stations. Any slave station may transmit a negative acknowledgement but only the primary slave may transmit a positive acknowledgement. Positive and negative acknowledgements are transmitted substantially simultaneously. Negative acknowledgements corrupt reception of the positive acknowledgement by the master station, thereby ensuring that the data is retransmitted. The primary slave station is selected to have the lowest quality radio link, which may be ensured by a power control command from the master.

16 Claims, 4 Drawing Sheets

RADIO SYSTEM AND STATIONS FOR, AND METHOD OF, MULTICAST COMMUNICATION

Figure 1:
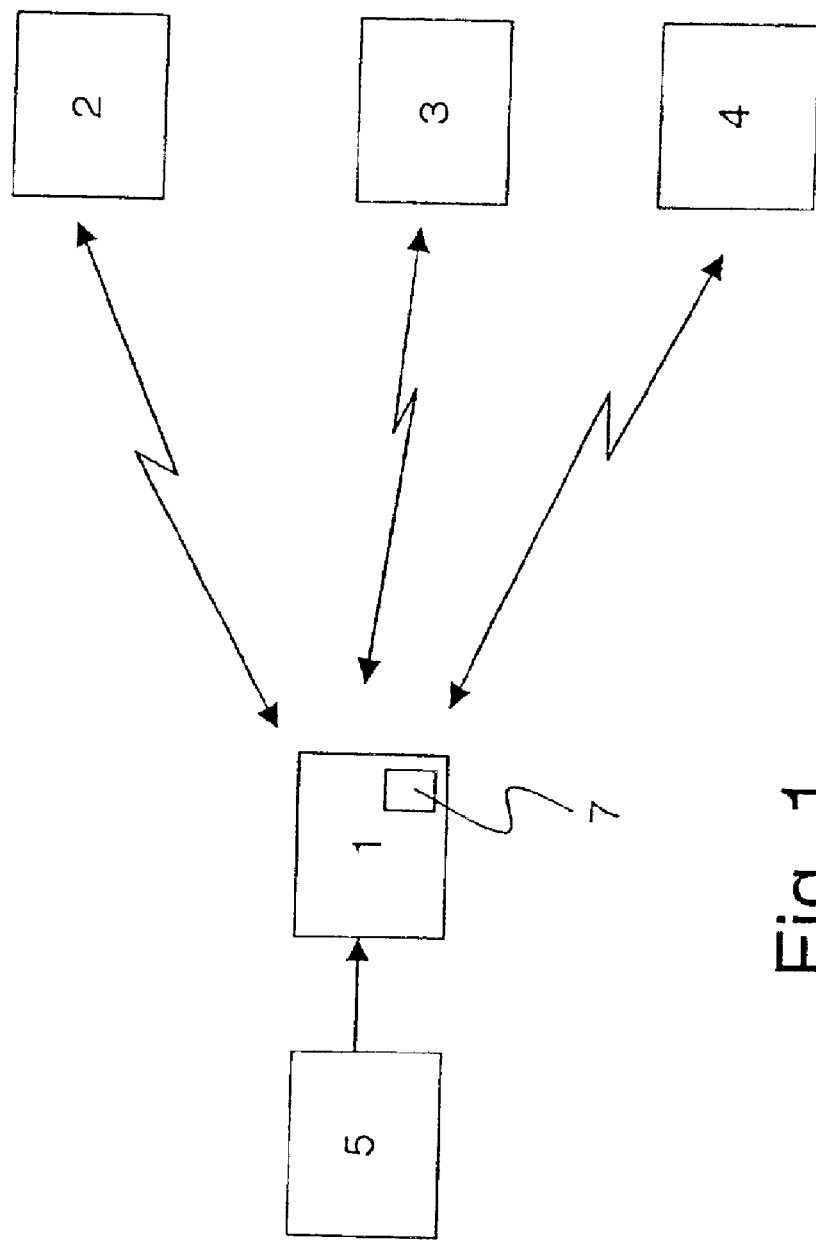

The invention relates to a radio system for, and method of, multicast data communication, and master and slave stations for use in a multicast radio network, and has particular, but not exclusive, application to the distribution of audiovisual data streams.

In point-to-point communication of digital information over a radio link it is common practice to divide the digital information into data packets and to employ error protection in the form of a retransmission protocol in which the receiving device transmits an acknowledgement for each data packet received. If a data packet is received correctly the acknowledgement is a positive acknowledgement (ACK), in which case the sending device proceeds to send the next data packet. If the data packet is received corrupted by errors the acknowledgement is a negative acknowledgement (NACK), in which case the sending device normally retransmits the data packet.

In multicast radio communication there is a single radio station, commonly referred to as a master station, sending data to more than one receiving station, commonly referred to as slave stations. There are three basic alternative methods of operating such communication.

First, the digital information is broadcast to all slaves, and no acknowledgements are transmitted by the slaves. The disadvantage of this is that retransmissions cannot be requested when data packets are corrupted. This method is defined, for example, in the MPT1327 specification published by the UK Radiocommunications Agency, November 1991.

Second, the digital information is transmitted to each slave in turn, and each slave acknowledges receipt in turn. This method of operation is as a set of point-to-point communication links. The disadvantage of this is the cumulative time taken to serve all slaves, or the increased spectrum requirement if the data transmission rate is increased to offset the delay or if each link operates on a different frequency.

Third, the digital information is broadcast to all slaves and then each slave is interrogated in turn to determine whether the information has been received. The disadvantage of this is the cumulative time taken to interrogate all slaves. This method is also defined in the MPT1327 specification published by the UK Radiocommunications Agency, November 1991.

Time delay is a problem especially for time critical data such as audiovisual stream information. An example of an application of multicast radio communication for the transmission of an audiovisual data stream is wireless loudspeakers. Wireless loudspeakers are desirable as a way to reduce cable installation. There is a requirement for different loudspeakers to receive different information, for example the left and right audio channels of a stereo pair, or several channels in a surround sound application.

The radio link from the master station to each wireless loudspeaker can be operated simultaneously as a set of point-to-point links. The disadvantage of this is that the master requires more bandwidth than a single point-to-point link, and may need multiple radio transceivers. Furthermore, the different audio channels are typically available prior to transmission over the radio link as a single multichannel mix incorporating audio coding and compression, and sometimes joint coding of channels, as used in the MPEG joint stereo mode. It is desirable to transmit the different channels as a single stream multichannel mix in order to avoid the complexity of separating the different channels prior to transmission and to avoid the requirement to synchronise such separated channels received by different receiving devices.

An object of the invention is to provide improvements in multicast radio communication.

According to one aspect of the invention there is provided a method of operating a multicast radio network including a master radio station and a plurality of slave radio stations, comprising transmitting data from a master station, receiving the data at each of the plurality of slave stations, at each slave station, determining whether the received data is decodeable or undecodeable, transmitting a negative acknowledgement if the received data is undecodeable, transmitting a positive acknowledgement if the received data is decodeable and the slave station is in a first state, transmitting no acknowledgement if the received data is decodeable and the slave station is in a second state, wherein only one of the plurality of slave stations is in the first state.

According to a second aspect of the invention there is provided a multicast radio system comprising a master radio station and a plurality of slave radio stations, the master station comprising means for transmitting data and means for receiving acknowledgement messages from the slave stations, each slave station comprising means for receiving data from the master station, means for determining whether the received data is decodeable or undecodeable, means for transmitting a first acknowledgement message if the received data is undecodeable, means for transmitting a second acknowledgement message if the received data is decodeable, and means for setting the slave station into a first state wherein transmission of the second acknowledgement message in response to receiving decodeable data is enabled and means for setting the slave station into a second state wherein transmission of the second acknowledgement message in response to receiving decodeable data is disabled, wherein only one of the plurality of slave stations is in the first state and wherein a plurality of the said messages transmitted by the slave stations are at least partially concurrent.

According to a third aspect of the invention there is provided a master station for use in a multicast radio network, comprising means to transmit a first command instructing a slave station to adopt a first state wherein transmission of an acknowledgement message in response to receiving decodeable data is enabled and a second command instructing the slave station to adopt a second state wherein transmission of the acknowledgement message in response to receiving decodeable data is disabled.

According to a fourth aspect of the invention there is provided a slave radio station for use in a multicast radio network including a master station and a plurality of the slave stations, the slave station comprising means for receiving data, means for determining whether the received data is decodeable or undecodeable, means for transmitting a first acknowledgement message if the received data is undecodeable, means for transmitting a second acknowledgement message if the received data is decodeable, and means for setting the slave station into a first state wherein transmission of the second acknowledgement message in response to receiving decodeable data is enabled and means for setting the slave station into a second state wherein transmission of the second acknowledgement message in response to receiving decodeable data is disabled.

In the present specification and claims, a reference to a master station or to a slave station does not preclude a station with dual functionality that can function as either a master or slave, according to the prevailing communication requirement. Furthermore, in the present specification and claims a radio station supports radio communication essential to the present invention, and may also include functionality relating to the apparatus that the data is communicated to or from. An example of a master radio station is a domestic compact disc player comprising radio functionality related to implementing the present invention and also functionality for playing a compact disc. An example of a slave radio station is a wireless loudspeaker comprising radio functionality related to implementing the present invention and also including a loudspeaker.

In one embodiment of the system in accordance with the invention there is a radio network comprising a master radio station and a plurality of slave radio stations. Data packets are transmitted by the master station and received by the slave stations. The slave stations are equipped to transmit a positive acknowledgement and a negative acknowledgement. A retransmission protocol using the positive and negative acknowledgements operates as follows. If the master station receives a positive acknowledgement from a slave station it proceeds to transmit the next data packet, if any. If the master station receives a negative acknowledgement from a slave station, or no acknowledgement, it retransmits the previously transmitted data packet.

In order to prevent positive acknowledgements transmitted substantially simultaneously by different slave stations from corrupting each other such that the master station does not receive any positive acknowledgement, only one slave station, designated the primary slave station, is enabled to transmit a positive acknowledgement, the other slave stations being disabled from transmitting a positive acknowledgement. Slave stations that are disabled from transmitting a positive acknowledgement are designated secondary slave stations. The designation of a slave station as either primary or secondary may be user controlled.

All slave stations are enabled to transmit a negative acknowledgement. Negative acknowledgements transmitted substantially simultaneously by different slave stations may corrupt each other, preventing reception by the master station, but this corruption results in the master retransmitting the previously transmitted data packet, which is the same action as if a negative acknowledgement had been received. If a negative acknowledgement is transmitted by a secondary slave station substantially simultaneously with a positive acknowledgement transmitted by the primary slave station, the negative acknowledgement corrupts the positive acknowledgement, resulting in a retransmission by the master of the previously transmitted data packet. This embodiment may be used, for example, when the quality of the radio link between the master station and each slave station is similar.

In a second embodiment of the system in accordance with the invention the master station is equipped to transmit commands to slave stations to select which one of the plurality of slave stations is designated the primary station. This embodiment may be used, for example, to avoid user action.

In a third embodiment of the system in accordance with the invention the master selects which one of the plurality of slave stations is designated the primary slave station by assessing the quality of the radio link between the master station and each slave station and selecting the slave station having the lowest quality link to be the primary slave station. This embodiment may be used, for example, when the quality of the radio link to the slave stations is not similar for all slave stations, to improve the probability of the positive acknowledgement transmitted by the primary slave station being corrupted by the negative acknowledgement transmitted by a secondary slave station.

In a fourth embodiment of the invention a slave station alters its transmitted power level in response to a command transmitted by the master station. This embodiment may be used, for example, to improve the probability of the positive acknowledgement transmitted by the primary slave station being corrupted by the negative acknowledgement transmitted by a secondary slave station.

If desired, the master station and/or each of the slave stations may be implemented in an integrated circuit.

Figure 2:
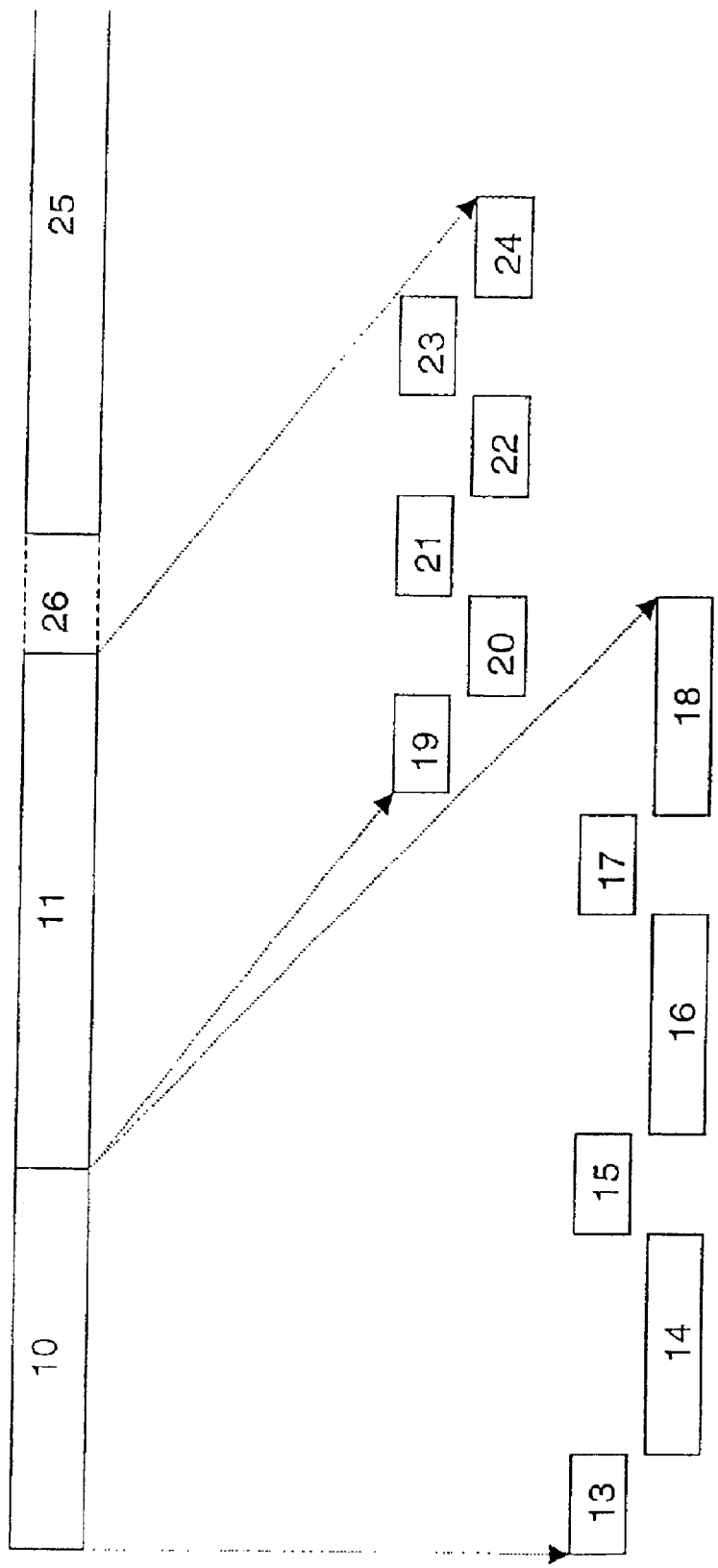
Figure 3:
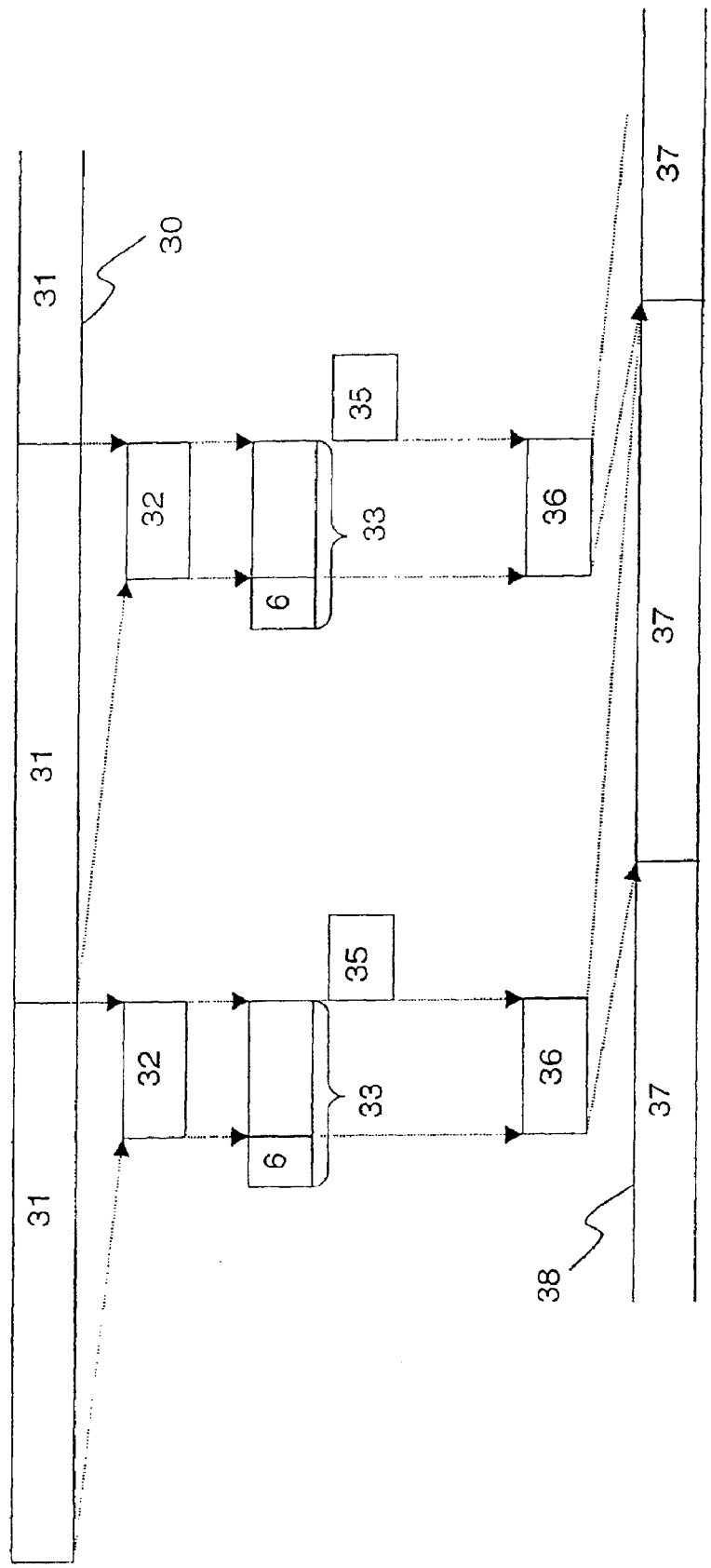
Figure 4:
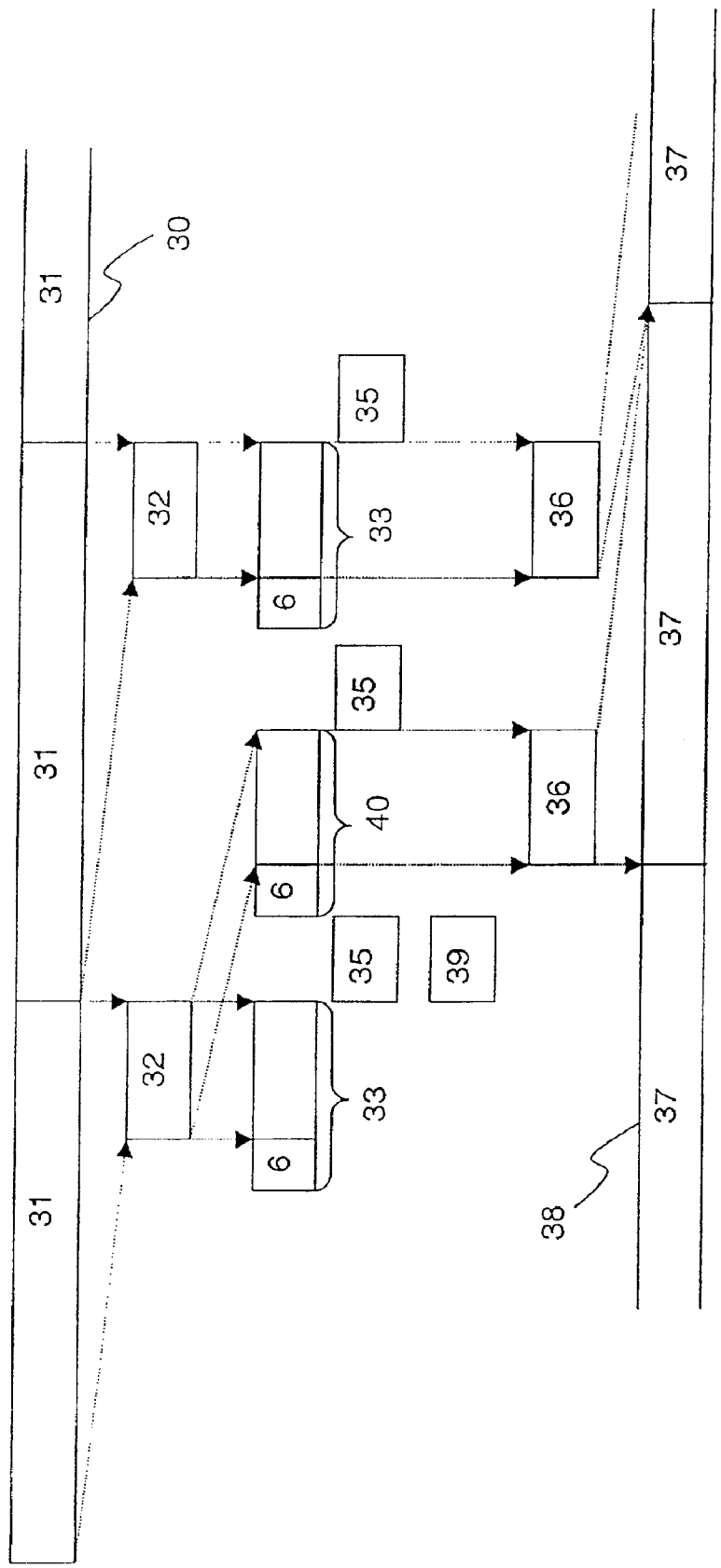

The invention will now be described, by way of example, with reference to the accompanying drawings wherein;

FIG. 1 is a block diagram of a system comprising a master station and three slave stations, FIG. 2 is a diagram illustrating the phases of operation of the system, FIG. 3 is a diagram illustrating the flow of data communication messages in the system under error free communication conditions, and FIG. 4 is a diagram illustrating the flow of data communication messages in the system when communication errors occur. In the drawings the same reference numerals have been used to indicate corresponding features.

FIG. 1 shows a wireless network comprising a master station 1, for example a set top box, and first, second and third slave stations 2, 3 and 4, for example wireless loudspeakers. The master station 1 receives an isochronous digital audio data stream from a data source 5 for distribution to the slave stations 2, 3 and 4. The digital audio data stream is a multichannel mix of different audio for each wireless loudspeaker.

Referring to FIG. 2, after establishment of the wireless network there is an assessment phase 10. During the assessment phase the master station 1 assesses the quality of the radio link with each slave station 2, 3 and 4 in the wireless network. The master station 1 does this by transmitting an assessment command 13 to the first slave station 2 instructing the slave to transmit a signal 14, followed by transmitting an assessment command 15 to the second slave station 3 instructing the slave to transmit a signal 16, followed by transmitting an assessment command 17 to the third slave station 4 instructing the slave to transmit a signal 18. The master station receives each of the three signals 14, 16 and 18, and, by means of signal level measurement and assessment means 7, measures the received level of the respective signals, and assesses which signal has the lowest level and therefore provides the lowest quality radio communication.

The master station 1 selects the slave station having the lowest quality communication to be a primary slave station. It is possible that the communication quality for all three slave stations 2, 3 and 4 is similar, so in this case the master station 1 selects arbitrarily one of the slave stations 2, 3 and 4 to be a primary slave station. In the present example the first slave station 2 is selected to be the primary slave station. The second and third slave stations 3, 4 will be secondary slave stations.

Following the assessment phase there is an assignment phase 11 during which the master station 1 instructs each slave station 2, 3 and 4 to adopt the state of either a primary or secondary slave station. It does this by transmitting an assignment command 19 to the first slave station 2 instructing it to become a primary slave station, transmitting an assignment command 21 to the second slave station 3 instructing it to become a secondary slave station, and transmitting an assignment command 23 to the third slave station 4 instructing it to become a secondary slave station. Each slave station transmits an acknowledgement 20, 22, and 24 in response to their assignment command. The difference between a primary slave station and the secondary slave stations is that only a primary slave station can transmit a positive acknowledgement in response to receiving a decodeable data packet but both primary and secondary slave stations can transmit a negative acknowledgement in response to receiving an undecodeable data packet.

When the communication quality for all three slave stations 2, 3 and 4 is similar, the master station 1 may optionally include within the assignment command which instructs a slave station to become a primary slave station, an instruction to reduce the transmitted power level to a specified level, or by a specified amount which may be typically up to 20 dB. The specified reduction is a compromise as described below.

Following the assignment phase there is a data communication phase 25. This may following immediately after the assignment phase 11, or there may be a delay 26 if data communication is not required immediately. Further data communication phases may occur at intervals, as determined by communication requirements.

The flow of messages during the data communication phase 25 is illustrated in FIG. 3. Referring to FIG. 3 the digital audio data stream 30 arrives at the master station 1 at a rate R bits per second for distribution to the slave stations 2, 3 and 4. The master station divides the digital audio data stream 30 into segments 31 by writing the data into a buffer and reading the data from the buffer in segments 31.

The master station 1 encodes the data from each segment 31 with check bits for error detection and optionally error correction, to form an encoded segment 32. A header 6 is added to form a data packet 33. The data packet 33 is transmitted by the master station 1 and received by the slave stations 2, 3 and 4.

Each slave station 2, 3 and 4 decodes the data packet 33. If the data packet 33 is received error free, or if all of any errors can be corrected by means of the check bits, the data packet is deemed decodeable. If the data packet is corrupted by errors that cannot be corrected, whereby the data cannot be recovered error free, but if the errors are acceptable, the data packet is deemed decodeable. If the data packet is corrupted by errors that cannot be corrected, whereby the data cannot be recovered error free, and if the errors are unacceptable, whereby the errors would cause an unacceptable degradation in the data, the data packet is deemed undecodeable.

In response to receiving a data packet 33, the primary slave station transmits an acknowledgement message 35 to the master station 1.

If the data packet 33 received by the primary slave station is decodeable the acknowledgement message 35 transmitted by the primary slave station is a positive acknowledgement. The primary slave station also extracts the encoded data 36 from the data packet 33. The check bits are removed from the encoded data 36 thereby recovering the segment 37 of data, which is reconstituted into a digital audio data stream 38 by storing the segment 37 into a buffer and reading the data out of the buffer at a rate R bits per second. The reconstituted digital audio stream is delayed with respect to the received data packet in order to permit retransmission of the data packet if necessary, as described below. Subsequently the multiple channels in the digital audio data stream are demultiplexed but details of this are not described as they are unnecessary for the understanding of the present invention.

In response to receiving the positive acknowledgement, and if there is more data to be transmitted, the master station 1 generates and transmits the next data packet.

If the data packet 33 received by the primary slave station is undecodeable the acknowledgement message 35 transmitted by the primary slave station is a negative acknowledgement, and the data packet is discarded by the primary slave station.

In response to receiving the data packet 33, secondary slave stations do not transmit an acknowledgement message if the data packet is decodeable, and transmit a negative acknowledgement message if the data packet is undecodeable. The subsequent processing of the data packet 33, whether decodeable or undecodeable, is the same as for the primary slave station.

Referring to FIG. 4, the delay between receiving a data packet 33 and transmitting an acknowledgement is predetermined such that the negative acknowledgement message 39 transmitted by the secondary slave station, is substantially simultaneous to the acknowledgement message 35 transmitted by the primary slave station in response to receiving the same data packet, such that the latter message is not successfully decoded by the master station 1.

The transmitter power level reduction which may be specified during the assignment phase as described above is a compromise between ensuring that the positive acknowledgement transmitted by the primary slave station is received successfully by the master station 1 when no acknowledgement is transmitted by any secondary slave station, and ensuring that the positive acknowledgement message transmitted by the primary slave station is not successfully decoded by the master station 1 when a negative acknowledgement is transmitted by any secondary slave station.

In response to receiving a negative acknowledgement, or if no acknowledgement message is successfully decoded, the master station 1 retransmits the data packet 40, unless the validity of the data has expired.

The slave stations 2, 3 and 4 respond to receiving the retransmitted data packet 40 according to the rules described above for responding to the initial transmission transmission of the data packet 33. If any of the slave stations 2, 3 and 4 receive a duplicate of a data packet successfully received previously, the duplicate packet is discarded.

The encoded data 36 of a decodeable non-duplicate retransmitted data packet is extracted from the data packet and the segment of data is reconstituted into the digital audio data stream 38 by storing the segment into a buffer and reading the data out of the buffer at a rate R bits per second. The data reconstituted from a retransmitted data packet conforms with the same timing as data reconstituted from new data packets.

The master station 1 responds to further acknowledgement messages according to the rules described above in relation to initial acknowledgement messages. New data packets are transmitted by the master station 1 at intervals which are sufficient to permit the retransmission of a data packet during an interval without delaying the transmission of the next new data packet.

Optionally, the master station may reassess at intervals the quality of the radio communication with the slave stations and perform an assignment phase if it determines that a different slave station should become the primary slave station.

Although the embodiment is described in relation to a wireless network covering a small area with a small number of slave stations, the invention is also applicable to wider area networks and larger numbers of slave stations.

Although in the embodiment described the assessment of quality of a radio link is made by means of measurement of received signal levels, other measures of quality may be used such as measurement of bit error rate or checksum failure rate.

Although the embodiment has been described having a phase dedicated to assessment of radio link quality, the assessment phase may be combined with other link procedures such as paging procedures during the establishment of the wireless network.

Although the embodiment described has an interval between the transmission of new data packets which is sufficient for a single retransmission, the interval could be made large enough for more than one retransmission for improved communication reliability, at the expense of reduced throughput.

Although the embodiment described above with reference to the accompanying drawings has an assignment command which may include an instruction to reduce the transmitted power level, the instruction to reduce the transmitted power level may be transmitted in a separate command.

Although the invention has been described in relation to a system for distributing stream data, it can be applied to non-stream data.

Optionally, for a simplified system, the slave stations could be manually set to be primary or slave stations.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the art of multicast radio communication and which may be used instead of or in addition to features already described herein.

What is claimed is:

1. A method of operating a multicast radio network including a master radio station and a plurality of slave radio stations, comprising transmitting data from a master station, receiving the data at each of the plurality of slave stations, at each slave station, determining whether the received data is decodeable or undecodeable, transmitting a negative acknowledgement if the received data is undecodeable, transmitting a positive acknowledgement if the received data is decodeable and the slave station is in a first state, transmitting no acknowledgement if the received data is decodeable and the slave station is in a second state, wherein only one of the plurality of slave stations is in the first state.

2. A method as claimed in claim 1, comprising setting at least one of the plurality of slave stations into one of the first and second states in response to receiving a command transmitted by the master station.

3. A method as claimed in claim 1 or 2, further comprising setting the one of the plurality of slave stations having the lowest quality radio communication with the master station to be the only one of the plurality of slave stations in the first state.

4. A method as claimed in claim 1 or 2, further comprising adjusting the transmitted power level of at least one of the plurality of slave stations in response to a command transmitted by the master station.

5. A multicast radio system comprising a master radio station and a plurality of slave radio stations, the master station comprising means for transmitting data and means for receiving acknowledgement messages from the slave stations, each slave station comprising means for receiving data from the master station, means for determining whether the received data is decodeable or undecodeable, means for transmitting a first acknowledgement message if the received data is undecodeable, means for transmitting a second acknowledgement message if the received data is decodeable, and means for setting the slave station into a first state wherein transmission of the second acknowledgement message in response to receiving decodeable data is enabled and means for setting the slave station into a second state wherein transmission of the second acknowledgement message in response to receiving decodeable data is disabled, wherein only one of the plurality of slave stations is in the first state and wherein a plurality of the said messages transmitted by the slave stations are at least partially concurrent.

6. A system as claimed in claim 5, wherein the means for setting the slave station into the first state is responsive to receiving a first command and the means for setting the slave station into the second state is responsive to receiving a second command, the first and second commands being transmitted by the master station.

7. A system as claimed in claim 5 or 6, wherein the master station has means for assessing the quality of radio communication with each slave station, and the only one of the plurality of slave stations in the first state is a slave station having the lowest quality radio communication with the master station.

8. A system as claimed in claim 6, wherein at least one of the plurality of slave stations comprises means to adjust its transmitted power level in response to receiving the first command from the master station.

9. A system as claimed in claim 6, wherein at least one of the plurality of slave stations comprises means to adjust its transmitted power level in response to receiving a third command from the master station.

10. A master station for use in a multicast radio network, comprising;

means to transmit a first command instructing a slave station to adopt a first state wherein transmission of an acknowledgement message in response to receiving decodeable data is enabled and a second command instructing the slave station to adopt a second state wherein transmission of the acknowledgement message in response to receiving decodeable data is disabled; and means to command a slave station to alter the transmitted power level of said slave station.

11. An integrated circuit comprising the master station as claimed in claim 10.

12. A slave radio station for use in a multicast radio network including a master station and a plurality of the slave stations, the slave station comprising means for receiving data, means for determining whether the received data is decodeable or undecodeable, means for transmitting a first acknowledgement message if the received data is undecodeable, means for transmitting a second acknowledgement message if the received data is decodeable, and means for setting the slave station into a first state wherein transmission of the second acknowledgement message in response to receiving decodeable data is enabled and means for setting the slave station into a second state wherein transmission of the second acknowledgement message in response to receiving decodeable data is disabled.

13. A slave station as claimed in claim 12, wherein the means for setting the slave station into the first state is responsive to receiving a first command and the means for setting the slave station into the second state is responsive to receiving a second command.

14. A slave station as claimed in claim 13, comprising means to adjust its transmitted power level in response to receiving the first command.

15. A slave station as claimed in claim 13, comprising means to adjust its transmitted power level in response to receiving a third command.

16. An integrated circuit comprising the slave station as claimed in any one of claims 12 to 15.

* * * * *